(12) United States Patent
Rudolph

(10) Patent No.: US 6,959,495 B2
(45) Date of Patent: Nov. 1, 2005

(54) HEDGE CUTTER

(75) Inventor: Hans-Ulrich Rudolph, Herdecke (DE)

(73) Assignee: Thono Beteiligungsgesellschaft mgH (DE)

( * ) Notice: Subject to any disclaimer, the term of this patent is extended or adjusted under 35 U.S.C. 154(b) by 0 days.

(21) Appl. No.: 10/343,000

(22) Filed: Jan. 15, 2003

(65) Prior Publication Data

US 2003/0136007 A1 Jul. 24, 2003

(51) Int. Cl.$^7$ .............................................. B26B 19/02
(52) U.S. Cl. ............................. 30/223; 30/355; 56/298
(58) Field of Search ........................ 30/223, 224, 225, 30/355, 357, 216; 56/296, 297, 298, 299

(56) References Cited

U.S. PATENT DOCUMENTS

| | | | | |
|---|---|---|---|---|
| 90,593 A | * | 5/1869 | Simonds ..................... | 76/89.1 |
| 477,198 A | * | 6/1892 | Champlin ................... | 30/198 |
| 513,834 A | * | 1/1894 | Smith ......................... | 56/299 |
| 834,969 A | * | 11/1906 | Clarkson .................... | 56/297 |
| 998,828 A | * | 7/1911 | Ballantine .................. | 30/211 |
| 2,047,300 A | * | 7/1936 | Warner ....................... | 76/89.1 |
| 3,200,493 A | | 8/1965 | Dodegge .................... | 30/216 |
| 3,564,714 A | * | 2/1971 | Wells .......................... | 30/223 |
| 3,579,827 A | * | 5/1971 | Grahn ......................... | 30/144 |
| 4,907,344 A | * | 3/1990 | Hahn .......................... | 30/355 |
| 5,581,891 A | * | 12/1996 | Wheeler et al. ............. | 30/216 |
| 5,640,837 A | * | 6/1997 | Ueyama ..................... | 56/298 |
| 5,987,753 A | * | 11/1999 | Nagashima ................. | 30/216 |
| 6,382,068 B1 | * | 5/2002 | Balke ......................... | 83/847 |

FOREIGN PATENT DOCUMENTS

| | | | | |
|---|---|---|---|---|
| DE | 1802914 U | 12/1959 | | |
| DE | 2164548 B | 7/1973 | ............ | A01G/3/04 |

* cited by examiner

Primary Examiner—Hwei-Siu Payer
(74) Attorney, Agent, or Firm—Renner, Kenner, Grieve, Bobak, Taylor & Weber; Edward G. Greive

(57) ABSTRACT

A hedge cutter having at least two cutting bars, movable relatively of each other and the cutting bars each have cutting edges, at least a part of which are provided with denticulations. Preferably, the cutting edge of each cutting bar is inclined at an angle running obliquely outwardly from the surface of each cutting bar with a cutting angle between substantially 30° and 50°. The opposed cutting teeth of the cutting bars may be arranged symmetrically, asymmetrically or anti-symmetrically.

9 Claims, 1 Drawing Sheet

HEDGE CUTTER

TECHNICAL FIELD

The present invention concerns a hedge cutter, especially for trimming a garden hedge.

BACKGROUND OF THE INVENTION

The use value characteristics of hedge cutters are determined by the target group and the field in which the implement is to be employed and are designed accordingly. The quality of a hedge cutter is determined in the first place by its driving power and its cutting performance. Important characteristics in this connection are safety, reliability, the handling characteristics, the vibration of the knife, the weight of the implement and the useful life of the cutting mechanism.

BRIEF SUMMARY OF THE INVENTION

The actual cutting system of a hedge cutter is often constituted by a cutter blade and a finger blade that as a general rule are driven by a motor in directions opposite to each other. Both the cutter blades and the finger blades are constituted by cutter bars, each provided with V-shaped and laterally projecting knife blades on both sides, each blade consisting of two cutting edges that come together at the tip of the V and are determined by bevelled cutting surfaces. The arrangement of the blades can be symmetric, asymmetric or anti-symmetric. But there are also hedge cutters with asymmetric knives in which both the cutter bars are provided with finger teeth on one side and cutter teeth on the other side. The two cutter bars are then mounted and superposed in such a manner that on each side there is always arranged one row of finger teeth and one row of cutter teeth. In this case the finger blades are made to be blunt and as a general rule the finger teeth project at least 8 mm beyond the cutter teeth. The blunt projecting parts of the finger teeth may be rounded, drop-shaped, mushroom-shaped and also pin-shaped.

In operation the cutter bars are moved towards each other, so that the branches to be cut are gripped between the knife blades and then separated by means of the cutting edges. Though depending also on the drive, the possible use of a hedge cutter and the demands that can be made on it are determined by the variable number of knife blades and the distance between them, as well as by the length of the cutter bars. The characteristics of the cutting mechanism, the material from which it is made and the heat treatments applied to this material have appropriate effects on the cutting performance and the useful life of the cutting edges.

In conventional hedge cutters the cutting edges are for the most part ground in the manner of wedges and in use will gradually lose their sharpness. A further problem consists of the fact that the cutter teeth are conical in shape, so that some of the branches to be cut may be pushed sideways and away from the blade before it can be gripped and cut by the cutting edge. This gives rise to hedge surfaces that are not cleanly cut and causes corresponding extra costs due to complicated and time-consuming cutting corrections. Though implements are known in which—with a view to avoiding these problems—either the geometry of the lower cutter bar is made to be drop-shaped at the end or use is made of an asymmetric cutting system, but this involves additional production costs without improving the cutting properties. Furthermore, the production of the upper cutter bars, especially the grinding of the blade geometry, is technically relatively complex. Consequently, blunt cutter bars cannot be reground to a good quality standard without special technical equipment. The cutting performance of the implement therefore gradually diminishes due to the blunting of the cutting edges.

The invention therefore sets out to obtain an improvement of the cutting results by means of a more efficient cutting geometry and thus to lengthen the useful life of the cutter bars. Another aspect of the invention is intended to render the regrinding of the cutting edges superfluous.

According to the invention this aim is achieved by means of a hedge cutter, especially a motor-operated hedge cutter, with at least two cutter bars that are moved in opposite directions with respect to each other, each of which is provided with cutter blades that are arranged at a certain distance from each other and have their cutting edges delimited by cutting surfaces, where at least a part, but preferably all of the cutting edges are provided with denticulations. These denticulations may be provided on or along particular regions of the cutting edge, but are preferably provided essentially along the whole of the cutting edge.

Preferably the cutting edge of the cutting teeth of the hedge cutter in accordance with the invention will be arranged at an angle that—in the manner of a wedge—runs obliquely outwards from the surface of the cutter bar, where said angle lies in the range between 30 and 50° and preferably amounts to 45°.

As a general rule the denticulation of the profile of the cutting edge will have at least a first included angle, said included angle lying in the range between 90 and 120°. Furthermore, the various blades of the cutter bar may be arranged in a symmetric, asymmetric or anti-symmetric pattern. It is possible for the cutting edges to be provided with denticulations on only one of the cutter bars, especially the upper cutter bar, but preferably all the cutter bars will have their cutting edges denticulated and/or provided with an appropriate denticulation.

Preferably the angle of inclination of the cutting faces with respect to the perpendicular to the centre line of the cutter bar will amount to between 22 and 26°.

BRIEF DESCRIPTION OF THE DRAWINGS

A preferred embodiment of the invention will now be described with the help of the drawing, where.

DETAILED DESCRIPTION

Motor-operated hedge cutters usually comprise two cutter bars arranged on top of each other, each of the cutter bars being provided with V-shaped, tooth-like blades on both sides. These cutter bars are driven by the motor and moved relative to each other in order to cut the material, generally branches, hedges and the like. In this connection a distinction is generally made between asymmetric and symmetric arrangements of the cutter bars. In the case of an asymmetric arrangement, one of the cutter bars is provided with blunt finger teeth on one side, while on the other side it carries cutter teeth that are shorter in length than the finger teeth.

The second cutter bar likewise has the finger teeth on one side and the cutter teeth on the other. The two cutter bars are then arranged in the hedge cutter in such a manner that the finger teeth situated on the one side of the first cutter bar are aligned with the cutter teeth situated on the other cutter bar and therefore work together. But there are also the so-called symmetric hedge cutters in which one of the cutter bars is provided with cutter teeth on both sides, while the other cutter bar has finger teeth on both sides. All these cutter bars may be designed in accordance with the invention, and the design in accordance with the invention can be applied to both finger teeth and to cutter teeth. But, as will be explained further on, the invention may also be applied to just a part of the teeth.

Figure 1:
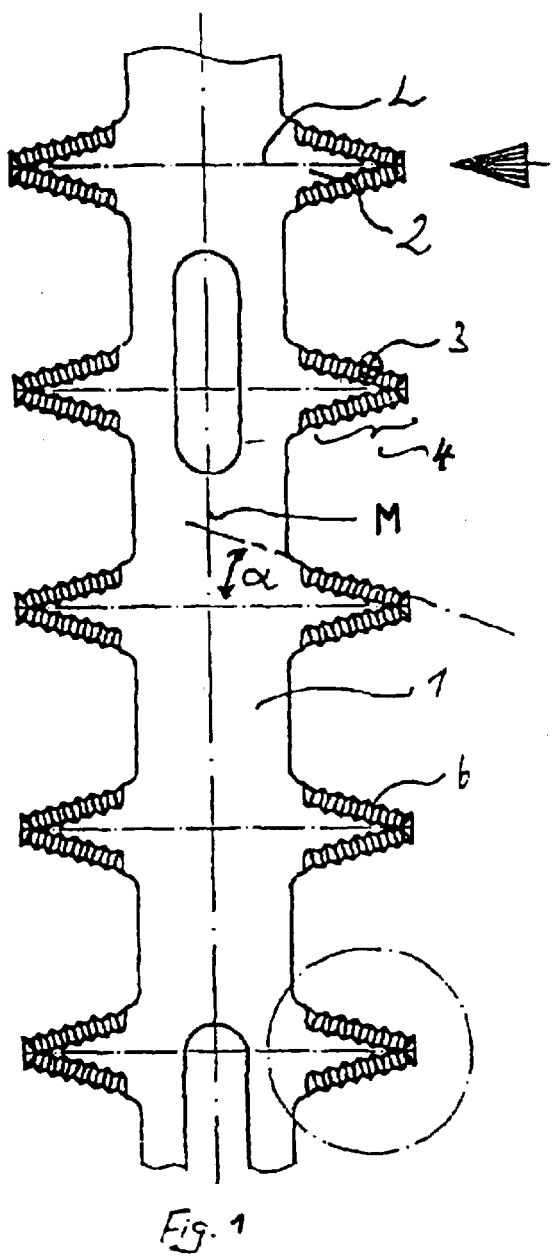
FIG. 1 shows a cutter bar of a hedge cutter as seen from above.

The cutter bar 1 shown in FIG. 1 and used in the hedge cutter in accordance with the invention is provided with preferably V-shaped, tooth-like cutter blades both on the right and on the left as seen from the centre of the cutter bar. These blades, which are equidistant from each other, point outwards and are arranged in a mirror-symmetric manner opposite each other on the two sides, though this arrangement constitutes an example and is not obligatory. Depending on the cutting speed and the nature of the material that is to be cut, the successive blades 2 will be spaced at a particular distance. Thus the size of the cutter blades 2 depends on the outward projecting length of the cutting edges 3 arranged on both sides of the blades and on the angle of inclination $\alpha$ between the cutting edges and the perpendicular L with respect to the centre line M of the cutter bar, which may amount to between 22 and 26° for example, and can therefore be readily varied. If necessary, the cutting edges 3 could also be given a polygonal shape. In the example here illustrated, the two cutting surfaces (blades) 4 are formed symmetrically around the perpendicular L with respect to the centre line M of the cutter bar 1. It goes without saying that, over and above the trapezoidal pattern of the knife blades 2 here shown by way of example, other arrangements are equally possible, cases in point being patterns with radii, sinusoidal patterns, and also other wave forms. This is also true as regards the shape of the cutting edges. The cutting surface 4 of a knife blade 2 is bevelled, i.e. it runs obliquely downwards from the surface of the cutter bar in the direction of the underside of the cutter bar 1 and there forms an angle $\beta$ (see the schematic representation of FIG. 3). Impressed on this cutting surface 4 running obliquely towards the underside of cutter bar 1 is a denticulation 6, which is shown to a larger scale in FIG. 2. This can be done by means of rolling or grinding, possibly also by means of a milling process or a cutting process, as also a stamping process, whereby more or less tooth-like flutings are formed and constitute this denticulation on the cutting edges.

Figure 2:
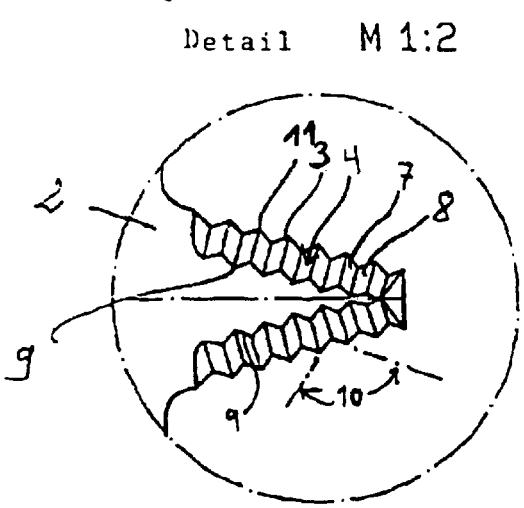
FIG. 2 shows a detail of the denticulations of a cutting edge.

According to FIG. 2, which shows a single cutter tooth or knife blade 2, the denticulation in question is a kind of oblique (or bevelled) denticulation. For the upper side of cutter bar 1 there is defined a first flank angle 9 between two flanks 7, 8 that can differ from a second flank angle 10 defined for the lower side of cutter bar 1.

Figure 3:
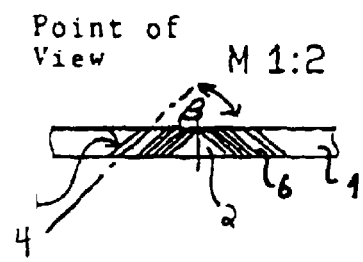
FIG. 3 shows a side elevation of the cutting edge denticulations of FIG. 1, all the figures being purely schematic.

FIG. 3 shows a side elevation of the cutter bar 1 as seen when looking frontally towards a cutter tooth 2, where by way of example it was assumed that the thickness of cutter bar 1, i.e. the cutting surface extending over the cutting surfaces 4 of cutter tooth 2, remains constant. But it goes without saying that the thickness of cutter bar 1 over the cutting surface 4 could also be varied or could be bevelled outwardly on one side, on both sides or in the manner of a wave. Since the cutting edges 3 of cutter bar 1 have been modified in such as way that the cutting edge 3 is no longer ground smooth as a single knife blade, the basic form of the cutting edge 3 is now made up of a number of pointed teeth 7, 8 that constitute the denticulation. Due to the fact that in accordance with the invention the cutting surface 4 has an inclination $\beta$, one thus obtains an advantageous wedge effect that that has positive repercussions on the cutting performance. The fact that the cutting surface is designed as a shaped denticulation 7, 8 with V-shaped teeth that taper into a sharp edge has the effect of increasing the surface area that is effectively available as cutting surface 4 even though the overall dimensions of the cutter tooth remain the same—this area may be doubled for example—and this will once again maximize the cutting performance. In the illustrated embodiment the denticulation is to all intents and purposes provided over the entire cutting edge, start from the tip of the tooth, but denticulations in a more limited area, possibly in the region of the tip or in the centre region of the cutting edges would also be appropriate.

The denticulation 6 can be appropriately adapted to match the material that is to be cut, especially the type of wood involved, but also to match particular applications, i.e. whether the branches to be cut are very thin or more substantial. This can be done, in particular, by varying the number of pointed teeth 7, 8 provided along each cutting edge. The thinner the material that is to be cut, the more appropriate will it be to have cutter blades with fine denticulations, i.e. where each cutting edge or cutting surface is provided with a larger number of flutings and therefore consists of a larger number of teeth 7, 8. In actual practice, therefore, cutter bars will be produced with different denticulation structures, ranging from coarse to fine, each suitable for a particular application case.

When the hedge cutter is operated, the tips 11 of the teeth 2, i.e. the tips of the cutting edges that have been rendered jagged by the denticulation, will be the first to penetrate into the material that is to be cut and this has the advantage that, given the (large) number of tooth tips 11, the material to be cut will no longer be pushed out of the way. Further, the cut is effected by means of the tooth flanks 7, 8 of the individual teeth 2. Given the discontinuous geometry of the cutting edges in accordance with the invention and the sharp edges of the denticulation 7, 8, the efficiency of the penetration and the cutting is stepped up and corresponds to an ever new gripping and cutting of material that is to be removed.

Surprisingly it has been found that the useful life of the cutter bar is also improved when the cutting edges 3 are denticulated in accordance with the invention. This denticulation avoids the otherwise inevitable blunting associated with ground cutting edges, which can no longer occur with the geometry in accordance with the invention. Even when the material from which the cutter bar is produced in accordance with known processes becomes reduced in size as a result of losses produced by wear and tear, there will be no change in the sharpness of the cutting edges. In particular, the denticulation in accordance with the invention will remain in being notwithstanding the continuous wear, thus assuring, as it were, a self-sharpening of the blades. The denticulation of the cutting edges in accordance with the invention thus considerably increases both the useful life of a hedge cutter and its effective use value.

What is claimed is:

1. A hedge cutter for cutting materials having a thickness with two bars that can be moved in directions opposite to each other for gripping and cutting, wherein one of the bars is a cutter bar provided with cutting teeth that are spaced a certain distance from each other and have cutting edges delimited by cutting surfaces, characterized in that at least a part of the cutting edges and the cutting surfaces is provided with denticulation, the cutting surfaces being inclined at cutting angles between a lower surface and an upper surface of the cutter bar, where the cutting angles are in the range between 30 and 50°, and the denticulation provided on the cutting edges runs along the cutting surfaces from the lower surface to the upper surface of the cutter bar, the cutter bar having a center line wherein an angle of inclination between the cutting surfaces and a line perpendicular with respect to the center line of the cutter bar is between 20 and 30°.

2. A hedge cutter for cutting materials having a thickness with two bars that can be moved in directions opposite to each other for gripping and cutting, wherein one of the bars is a cutter bar provided with cutting teeth that are spaced a certain distance from each other and have cutting edges delimited by cutting surfaces, characterized in that at least a part of the cutting edges and the cutting surfaces is provided with denticulation, the denticulation on the cutting edges including at least two pointed teeth abutting one another, each tooth having two flanks, the flanks of abutting pointed teeth being joined at a flank angle having a value in the range between 90 and 140 degrees.

3. A hedge cutter in accordance with claim 2, characterized in that the cutting surfaces are inclined at cutting angles between a lower surface and an upper surface of the cutter bar, where the cutting angles are in the range between 30 and 50°, and the denticulation provided on the cutting edges runs along the cutting surfaces from the lower surface to the upper surface of the cutter bar.

4. A hedge cutter in accordance with claim 3, characterized in that the cutter bar has a first and a second side, wherein the cutting teeth extend laterally outwardly from the first side and the second side, and the cutting teeth on the first side are selectively symmetrically, asymmetrically, and anti-symmetrically arranged with respect to the cutting teeth on the second side.

5. A hedge cutter in accordance with claim 3, characterized in that the number of teeth comprising the denticulation is inversely proportional to the thickness of the material to be cut.

6. A hedge cutter in accordance with claim 2, characterized in that the cutting teeth have lower surfaces and upper surfaces, wherein the cutting surfaces extend outwardly from the upper surfaces of the cutting teeth, and the cutting surfaces intersect with the lower surfaces of the cutting teeth to form the cutting edges.

7. A hedge cutter in accordance with claim 6, characterized in that the intersection of the cutting surfaces and lower surfaces of the cutting teeth is wedge-shaped.

8. A hedge cutter in accordance with claim 2, characterized in that the number of pointed teeth comprising the denticulation is inversely proportional to the thickness of the material to be cut.

9. A hedge cutter in accordance with claim 2, characterized in that the denticulation provided on the cutting edges runs along the cutting surfaces from a lower surface to an upper surface of the cutter bar, and the cutting surfaces are inclined at cutting angles in the range between 30 and 50°.

* * * * *